United States Patent Office 3,740,432
Patented June 19, 1973

3,740,432
VITAMIN COMPLEXES OF NIACINAMIDE, RIBOFLAVIN AND SODIUM ASCORBATE
Louis Magid, Clifton, N.J., assignor to Hoffmann-La-Roche Inc., Nutley, N.J.
No Drawing. Continuation-in-part of application Ser. No. 672,958, Oct. 5, 1967. This application Feb. 16, 1971, Ser. No. 115,721
Int. Cl. A61k 15/12
U.S. Cl. 424—252                5 Claims

ABSTRACT OF THE DISCLOSURE

Complexes of niacinamide and riboflavin as well as niacinamide, riboflavin and sodium ascorbate are described. These complexes are hard, free-flowing granules which can be directly compressed into tablets.

RELATED APPLICATIONS

This application is a continuation-in-part of U.S. patent application Ser. No. 672,958 filed Oct. 5, 1967, now abandoned.

BACKGROUND OF THE INVENTION

The formation of multivitamin tablets by direct compression containing one or more vitamins in admixture with conventional excipients and adjuncts is known to the art. The function of such inert ingredients is to aid the flow of the formulation ingredients prior to compression and to act as binders for the ingredients after the tablet has been formed. Such inert materials are ordinarily essential to provide a compressible mixture and to improve such properties as stability, hardness and disintegration characteristics of the tablets produced therefrom. However, in cases where powdered materials such as riboflavin, niacinamide and sodium ascorbate are desired in such tablets, handling problems have arisen in prior art methods of forming tablets since these powders have a dusty consistency, poor binding and poor flow characteristics. Thus, there is a need for stable forms of niacinamide, riboflavin and sodium ascorbate which will permit the formation of vitamin tablets having excellent stability, hardness and disintegrating characteristics while at the same time possessing minimal physical handling disadvantages. There is an even greater need for a form of these three vitamins which can be formulated into tablets by direct compression.

SUMMARY OF THE INVENTION

The present invention relates to novel vitamin complexes which are utilzed in the production of multiple vitamin tablets by direct compression and tablets prepared therefrom. More particularly, this invention relates to granular complexes of niacinamide, riboflavin and sodium ascorbate, a process for the preparation of such complexes and tablets prepared therefrom.

DETAILED DESCRIPTION OF THE INVENTION

In accordance with the present invention it has been discovered that niacinamide, riboflavin and sodium ascorbate can be formed by the process of wet granulating into a novel, therapeutically useful complex. The complex thus-formed comprises hard, non-caking, free-flowing granules which are ideally suited for the formation of pharmaceutically elegant tablets by direct compression. Heretofore this was not possible with commercially available forms of these vitamins without the use of comparatively large quantities of pharmaceutical binders, excipients and the like. The complex granules of the invention can also be admixed with other vitamins, excipients, lubricants and the like and the resulting mixture directly compressed into multivitamin tablets.

The tablets thus produced are formed by means well known in the art of pharmaceutical compounding, i.e., the granules are admixed with a conventional tabletting lubricant, i.e., calcium stearate, magnesium stearate, stearic acid, talc and the like and the mixture subsequently compressed directly in an automatic tabletting machine to form hard, glossy tablets containing relatively high potencies of vitamins per unit volume. The tablets produced from the granular complexes of the invention can contain relatively high potencies of the vitamins as the direct compressibility of the granules facilitates the virtual elimination of binders and excipients commonly utilized in the production of multivitamin tablets. The elimination of a high percentage of these inert materials results in a considerable saving in tablet cost and, more important, tablet space. The saving in table space afforded by the direct compressibility of the novel granular complexes of the invention is critical in the production of multivitamin tablets which of necessity must be as small as practical in relation to their potency.

The relative amounts of niacinamide, riboflavin and sodium ascorbate which can be mixed together to form a complex suitable for granulation and direct compression into tablet can vary over rather wide limits. Generally, there is used, on a weight basis, for each part of riboflavin, from about 5 to about 40 parts of niacinamide and from about 10 to about 150 parts of sodium ascorbate. More particularly, the complexes of the invention contain for each part by weight of riboflavin, from about 10 to about 20 parts by weight of niacinamide and from about 20 to about 60 parts by weight of sodium ascorbate. A more preferred complex in accordance with the invention contains for each part by weight of riboflavin, from about 11 to about 15 parts by weight of niacinamide and from about 22 to about 30 parts by weight of sodium ascorbate. Also, within the purview of the present invention is a granulation containing only niacinamide and riboflavin in the proportions of from about 10 to about 20 parts by weight niacinamide for each part by weight riboflavin.

The granular complexes of niacinamide, riboflavin and sodium ascorbate as well as the niacinamide-riboflavin complexes prepared in accordance with the invention can be formulated into multivitamin tablets which are prepared by direct compression, a process well recognized in the art which comprises forming an intimate admixture of the tablet ingredients and directly compressing said mixture on conventional tabletting equipment. Such formulations contain other vitamins such as, for example, vitamin $B_6$ and $B_1$ and suitable excipients such as, for example, Fast Flo Lactose (manufactured by Foremost Dairies, Inc.), STA–RX 1500 (staramic starch manufactured by A. E. Staley Co.), National Starch Co. starch granules—20 mesh, calcium phosphate granular, Avicel (microcrystalline cellulose manufactured by American Viscose Corp. Inc.) and Direct Tablet Grade Lactose (manufactured by Sheffield Chemical).

The granular complexes of the present invention are formed by wet granulating a homogeneous admixture of the ingredients utilizing a conventional wet granulating liquid recognized in the art, preferably water.

The following examples illustrate the invention, which is not intended to be limited thereto. All temperatures are in degrees centigrade.

EXAMPLE 1

(a) The following granular complex was made using a formulation as follows:

| Ingredient | Parts/weight |
|---|---|
| Niacinamide | 220.0 |
| Riboflavin | 22.0 |
| Sodium ascorbate fine powder | 500.0 |

The niacinamide and riboflavin were mixed together with the sodium ascorbate and the mixture was then granulated with 67.5 parts by weight water. The granules were dried at 45° and ground to 16 mesh on a U.S. Standard Mesh Sieve.

(b) 100 grams of the complex formed in (a) were then mixed with 0.5 gram of magnesium stearate lubricant and compressed on 7/16 inch standard punches at about 500.0 mg. per tablet.

The resulting tablets were firm, shiny and showed no evidence of capping or lamination.

EXAMPLE 2

The granulation prepared in Example 1 was incorporated into a multivitamin tablet formulation and directly compressed into tablets on a Stokes model E tablet machine using a ½ inch standard concave punch. The materials as set forth in the following formulation were added in a dry state to the granulation and ths whole homogeneously blended and directly compressed.

| Ingredient: | Parts by weight |
|---|---|
| Granulation of Example 1 | 371.00 |
| Pyridoxine HCl | 5.50 |
| Vitamin E succinate | 18.50 |
| Calcium pantothenate | 30.00 |
| Vitamin A acetate | 62.50 |
| Vitamin $D_2$ | 0.59 |
| Vitamin $B_1$ mononitrate | 11.00 |
| Vitamin $B_{12}$ gelatin coated 0.1% | 6.25 |
| Avicel (microcrystalline cellulose) | 55.00 |
| Tricalcium phosphate—20 mesh | 55.00 |
| Calcium stearate | 5.00 |
| Weight/tablet, mg. | 620.00 |
| Hardness (Monsanto), kg. | 4.5–5.5 |

The ingredients were mixed together and compressed on a ½ inch standard concave punch to form hard shiny tablets which showed no evidence of capping or lamination.

EXAMPLE 3

(a) 220.0 grams of niacinamide and 22.0 grams of riboflavin were mixed together and granulated with 35.0 cc. of water, dried at 45° and ground to 20 mesh on a U.S. Standard Mesh Sieve, to form a niacinamide-riboflavin complex.

(b) 100.0 grams of the niacinamide-riboflavin complex granules formed in (a) were then mixed with 1.0 grams of calcium stearate and compressed on 7/16 inch standard concave punches at about 500.0 mg. weight per tablet.

The resulting tablets were firm, shiny and showed no evidence of capping or lamination. The Strong Cobb Hardness of the tablets was about 12.

EXAMPLE 4

Multivitamin tablets were prepared with the niacinamide-riboflavin complex granules prepared in Examples 3(a) by direct compression using the following formulations:

| Ingredient | Mg./tablet (a) | (b) | (c) |
|---|---|---|---|
| Vitamin $B_{12}$, gelatin coated 0.1% | 1.25 | 1.25 | 1.25 |
| Thiamine mononitrate crystals | 3.60 | 3.60 | 3.60 |
| Niacinamide-riboflavin complex | 24.20 | 24.20 | 24.20 |
| Pyridoxine HCL | 1.10 | 1.10 | 1.10 |
| Panthenol powder 33⅓% | 3.90 | 3.90 | 3.90 |
| Vitamin A palmitate powder, 500,000 I.U./gm | 130.0 | 13.00 | 13.00 |
| Vitamin $D_2$ powder, 850,000 I.U./gm | 07.7 | 0.77 | 0.77 |
| Tricalcium phosphate granular, 20-mesh | 300.0 | 30.00 | |
| Starch granules, 20-mesh (National Starch Co.) | 20.00 | 20.00 | 50.00 |
| Avicel (microcrystalline cellulose) | 49.00 | 49.00 | 49.00 |
| Ethocel (ethyl cellulose) coated, vitamin C | 58.90 | | |
| Superfine vitamin C (mesh sizes on U.S. Standard Mesh sieve, min. 95% through 60-mesh; max. 35% on 100-mesh, 50 to 70% through 200-mesh and 20 to 50% on 200-mesh | | 57.50 | 57.50 |
| Calcium stearate | 2.00 | 2.00 | 2.00 |

The ingredients for each formulation were mixed and compressed at 208 mg. per tablet on a 5/16 inch standard concave punch. Good flow and good tablets were obtained in each case.

I claim:

1. A granular vitamin composition suitable for the formation of tablets by direct compression comprising a complex formed by wet granulating a mixture consisting essentially of niacinamide, sodium ascorbate and riboflavin in a ratio of from about 5 to about 40 parts by weight niacinamide and from about 10 to about 150 parts by weight sodium ascorbate for each part by weight of riboflavin.

2. A granular vitamin composition in accordance with claim 1 wherein there is present for each part by weight of riboflavin from about 10 to about 20 parts by weight of niacinamide and from about 22 to about 60 parts by weight of sodium ascorbate.

3. A granular vitamin composition in accordance with claim 1 wherein there is present for each part by weight of riboflavin from about 11 to about 15 parts by weight of niacinamide and from about 22 to about 30 parts by weight of sodium ascorbate.

4. A multivitamin tablet containing the granular complex of claim 1.

5. A multivitamin tablet containing the granular complex of claim 2.

References Cited

UNITED STATES PATENTS

| 2,433,688 | 12/1942 | Fox et al. | 424—280 |
| 2,480,517 | 8/1949 | Stecher | 424—252 |
| 2,434,625 | 1/1948 | Ruskin | 424—280 |
| 3,308,217 | 3/1967 | Lowy et al. | 424—280 |

ALBERT T. MEYERS, Primary Examiner

V. D. TURNER, Assistant Examiner

U.S. Cl. X.R.

424—266, 280